United States Patent [19]

Djorup

[11] 4,279,147
[45] Jul. 21, 1981

[54] DIRECTIONAL HEAT LOSS ANEMOMETER TRANSDUCER

[76] Inventor: Robert S. Djorup, 20 Lovewell Rd., Wellesley, Mass. 02181

[21] Appl. No.: 110,841

[22] Filed: Jan. 10, 1980

[51] Int. Cl.³ .............................................. G01W 1/02
[52] U.S. Cl. ..................................................... 73/189
[58] Field of Search .......................... 73/189, 188, 204

[56] References Cited

U.S. PATENT DOCUMENTS

| | | | |
|---|---|---|---|
| 2,981,104 | 4/1961 | Auger et al. | 73/189 |
| 3,604,261 | 9/1971 | Olin | 73/189 |
| 3,991,624 | 11/1976 | Davies | 73/189 |

Primary Examiner—Jerry W. Myracle
Attorney, Agent, or Firm—Robert G. Mentag

[57] ABSTRACT

A directional heat loss anemometer transducer for sensing both the speed and direction of motion of a fluid, liquid or gas in which the transducer is immersed. The transducer is constructed of fine long cylindrical resistive conductors which are axially disposed about a central, cylindrical supporting body, wherein at least two conductors serve as a direction sensing pair which can also be used to determine impinging fluid speed. The sensing conductor pair are joined together by an adhesive connecting means thereby preventing independent flow between the individual conductors of the conductor pair. The electrical conductors can be metallic or resistive films which are deposited on a cylindrical supporting body, or they may be individual wires of circular cross section. Each conductor is made of a material which exhibits a change in its electrical resistance as a function of temperature. Electrical connections are provided at each end of each conductor to permit each conductor to be separately excited by an electrical current. Typically, the transducer is operated in air so as to provide a non-moving parts means for measuring a particular component of wind speed, and a pair of orthogonally mounted similar transducers can be used to determine sine and cosine components of wind speed. Electrical representation of both speed and direction is obtained by the use of a differential amplifier which is connected between the joined conductor pair mid-point and the mid-point of a reference pair of resistors thereby forming a four arm resistance bridge.

8 Claims, 5 Drawing Figures

DIRECTIONAL HEAT LOSS ANEMOMETER TRANSDUCER

TECHNICAL FIELD

This invention relates generally to an improved anemometer sensing apparatus for determining the motion of a fluid mass which surrounds the transducer or, conversely, motion of the transducer through the fluid. The invention is particularly concerned with a directional heat loss anemometer transducer for sensing both the speed and direction of motion of a fluid, as a liquid or a gas, in which the transducer is immersed.

BACKGROUND ART

The use of hot wires and hot films as anemometer transducers is well known in the prior art. Examples of prior art thermal anemometer sensors, and circuits therefor, are shown in U.S. Pat. Nos. 3,138,025, 3,333,470, 3,352,154, 3,604,261, 3,900,819 and 4,024,761, as well as in co-pending U.S. patent application Ser. No. 966,792 now U.S. Pat. No. 4,206,638. The present invention provides a significant improvement in the angular response or azimuth response of the transducer as well as a reduction in the excitation power which is needed to arrive at a useful operating sensitivity level.

Prior art transducers, which use no moving parts, have characteristically had some degree of difficulty in realizing a smooth and continuous transition from one direction to the opposite direction. The use of electrical "dither" signals and artificial "lobe switching" from side to side has helped to reduce axis crossing irregularities. Further improvement has been brought about by the use of a self-induced turbulent wake as a naturally occurring "dither" signal in the axis crossing regions.

DISCLOSURE OF THE INVENTION

The present invention uses a direction sensing pair of conductors which takes advantage of the naturally turbulent wake which occurs when virtually any interfering geometric body is placed in a moving fluid. By symmetrically arranging the sensing conductors' geometric positioning, in respect to that body, an aerodynamic "dither" signal is introduced into the direction sensor signal output for low angle flow, that is, flow which is nearly parallel to the sensing conductors' length. In effect, a variable amount of random turbulence is added to the output of the direction sensing pair of conductors as a function of incidence angle and speed of the impinging fluid. The least turbulence is introduced for flow normal to the major axis of the transducer and lying in the plane which contains the parallel axes of the sensing conductors. A pronounced flow from one side or the other side, causes the self-generated turbulent wake to be swept away from the transducer elements. Downward flow over the support, or flow containing a vertical component will induce a turbulent wake across the sensing element which is away from the flow source, further aiding in smoothing the axis crossing response of the transducer.

The directional heat loss anemometer transducer of the present invention includes at least two similar, thermally and physically separated, electrical conductors. Each of said electrical conductors has a length at least equal to the largest cross section dimension of the conductor. In one type of embodiment of the invention, each of said electrical conductors includes a hollow, tubular, electrically non-conductive refractory cylindrical substrate supporting body extending the length of the conductor, a conductive resistance film having a non-zero temperature coefficient of resistance adhered to the outer surface of the substrate body and extending over the length of the substrate body, and an overall protective coating which continuously extends over the outer surface of the conductive resistance film over the entire length of the conductive resistance film. In another type of embodiment the electrical conductors are wires, with solid or tubular cross sections. A cylindrical support element is centrally disposed between and alongside the two resistive electrical conductors. The cylindrical support may be straight, or it may have a straight middle section and two right angled legs bent to form a U shape. The electrical conductors are disposed as a pair, finitely separated, and mounted parallel to and in close proximity to the straight; middle section of the cylindrical support element. Connective bridging means is operatively disposed between said electrical conductors, where the plane containing the parallel central axes of the two conductors is perpendicular to the plane which is defined by the axis of said cylindrical support element. The bridging means closes the space between said conductors, thereby preventing connected flow completely around one conductor of the pair of two conductors, independent of the other conductor. The two conductors are supported in the protected lee of the cylindrical support element. Each of the electrical conductors is provided with electrical connection means, whereby each electrical conductor can be electrically heated by an electric current passed through each conductor. The electrical conductors are attached to the cylindrical support member by suitable attachment means. A modified embodiment of the invention may include a second similar cylindrical support member centrally disposed between and alongside the two electrical conductors, and situated on the side of the two electrical conductors opposite and parallel to the first cylindrical support member.

The present invention is further enhanced by the use of a single differential amplifier which is used to read out the composite speed and direction signal from said electrical conductor pair when they are connected together with two reference resistors to form a four arm Wheatstone bridge. This connection provides the greatest accuracy of read out, together with providing means for the electrical combining of mean impinging flow signals together with the support induced turbulence signals as an aid in smoothing the transducer's azimuth response.

While it will be apparent that the preferred embodiments of the invention herein disclosed are well calculated to achieve the results aforestated, it will be appreciated that the invention is susceptible to modification, variation and change.

BEST MODE OF CARRYING OUT THE INVENTION

Figure 1:
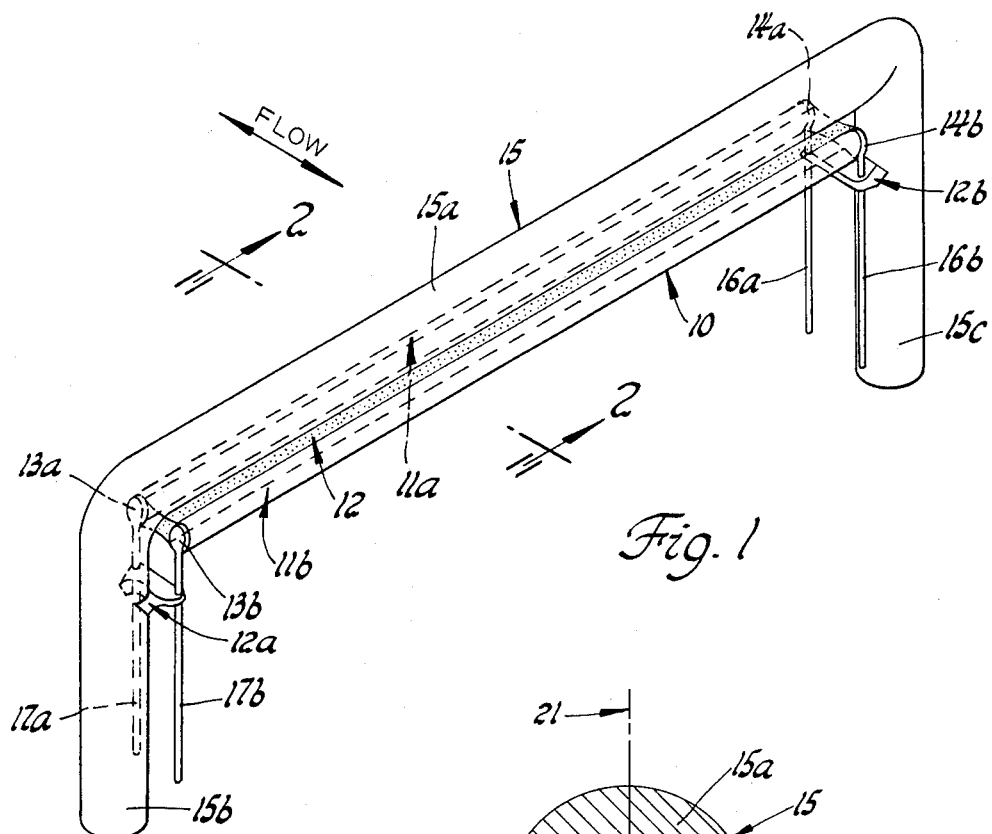
FIG. 1 is a perspective view of a directional heat loss anemometer transducer made in accordance with the principles of the present invention.
Figure 2:
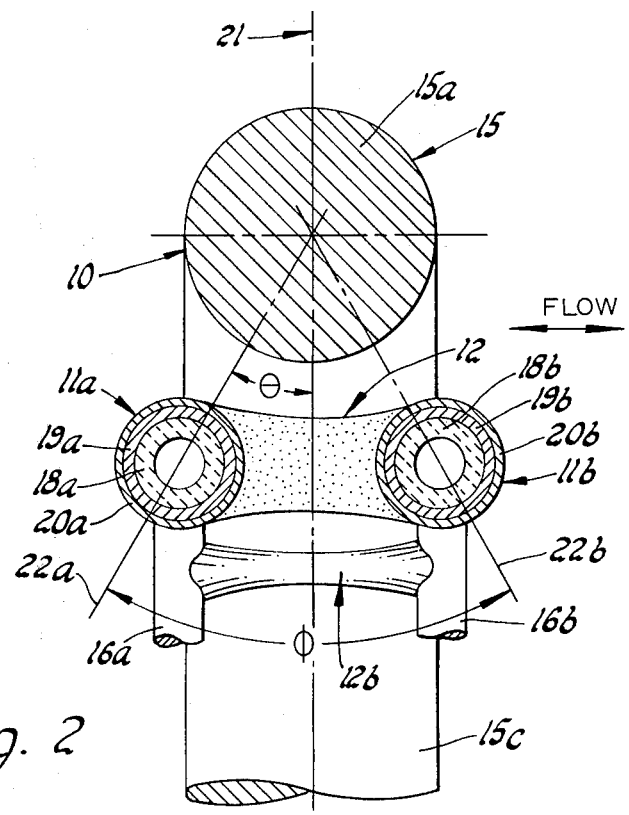
FIG. 2 is an elevational section view of the directional heat loss anemometer transducer structure illustrated in FIG. 1, taken along the line 2—2 thereof, and looking in the direction of the arrows.

Referring now to the drawings, and in particular to FIG. 1, the numeral 10 generally designates a directional heat loss anemometer transducer constructed in accordance with the principles of the present invention. The transducer 10 includes two cylindrical, parallel sensing elements or members, generally indicated by the numerals 11a and 11b, which are resistive sensing elements whose lengths are substantially greater than their diameters. Typically, the sensing members 11a and 11b may have an outside diameter of 0.6 mm, with an overall length of 25 mm, therefore having a length to diameter ratio of almost 42 to 1. As shown in FIGS. 1 and 2, the elements 11a and 11b are physically separated from each other, and they are joined or connected along their length by an adhesive or other bridging means 12. The sensing elements 11a and 11b are similar in construction, and they are thermally separated.

The pair of sensing elements 11a and 11b are mounted below and parallel to a cylindrical support member, generally indicated by the numeral 15. Sensing element pair 11a and 11b is attached to the cylindrical support member 15 by either adhesive or mechanical means 12a and 12b so that the geometric relationship between support member 15 and sensing elements 11a and 11b are maintained during all operating conditions. A semi-flexible adhesive such as "RTV" (a trademark) silicone rubber, Dow-Corning #732, or non-brittle epoxy resin can be used, or a formed metal or plastic connection which anchors and attaches the sensing elements 11a and 11b firmly to support 15 can be employed. The bodies of the sensing elements 11a and 11b have electrical connective means 13a and 13b, respectively, and electrical connecting wires 17a and 17b, respectively, at one end thereof, and like connection means 14a and 14b, respectively, and connecting wires 16a and 16b, respectively, at the other end thereof.

The support member 15 is shown as a rigid, U-shaped wire which can be made from plated steel, stainless steel or other cylindrical material. The support member 15 includes the central, cylindrical body portion 15a, and the two integral end mounting portions 15b and 15c. The end mounting portions 15b and 15c are disposed perpendicular to the central portion 15a. The end mounting portions 15b and 15c support the transducer 10 in an operative position. The bodies of the sensing elements 11a and 11b are uniformly covered with a resistive film, and the connection means 13a, 13b, 14a and 14b are made of similar material in order to avoid thermocouple junction effects, and thereby help to produce the lowest possible intrinsic electrical noise level of the transducer. The connecting lead wires 16a, 17a and 17b are also constructed of a material which is similar to that used by the end connection means 13a, 13b, 14a and 14b, in order to also produce the greatest signal to noise performance ratio, thereby permitting the greatest possible dynamic operating range. The material usually used is annealed platinum metal although other materials such as nickel can be used. Alternative materials which may be used for the sensing elements 11a and 11b are described in U.S. Pat. No. 3,352,154.

FIG. 2 illustrates a typical cross section for a directional heat loss anemometer transducer 10 of the construction shown in FIG. 1. The relative size of the parts of the transducer 10 can be understood from the fact that the cross section of the support member central portion 15a is made to a scale such that the diameter thereof, as shown, is approximately 1.6 to 1.8 mm. As shown in FIG. 2, the two sensing elements 11a and 11b are supported axially along the rigid support member central portion 15a which can be made of steel, plated steel, stainless steel, plastic, or other rigid material which is shaped as shown in FIG. 1, in order to provide means for mechanical mounting and support of the transducer 10. The support member 15 also provides a means for aerodynamically disturbing the end flow along the sensing elements 11a and 11b which are mounted directly within the U shape of the support member 15 and parallel to the long straight central section or cross bar 15a. A typical diameter of the cross-section of the support member 15 is two or three or more times that of the sensing members 11a and 11b, and in the configuration shown in FIGS. 1 and 2, the diameter of elements 11a and 11b is about 0.6 mm. The operation of each conductor of the direction sensing pair of conductors 11a and 11b will be similar when incident flow is contained within the plane described by the axis 21 of the U shape of the support member 15 which, in FIG. 2, is shown to be a vertical plane.

As shown in FIG. 2, the sensing element 11a consists of an electrically non-conductive, hollow, tubular, non-porous, dense aluminum oxide refractory fine cylindrical substrate body 18a, upon the surface of which is uniformly deposited by firing, sintering or other deposition means, a thin film or coating of platinum metal 19a. The substrate supporting body 18a may be made from other suitable materials that are electrically non-conductive, such as aluminum silicate or anodized aluminum and other ceramic materials. If a low temperature or room temperature deposition process is used, a plastic tubular substrate may also be employed. The coating 19a has a further layer 20a of fused silica, glass, aluminum oxide, "TEFLON" (a trademark) or other protective coating material which provides abrasion and wear protection for the metal film 19a. Typical dimensions for the substrate body 18a are a cylinder diameter of 0.6 mm, with a bore diameter of 0.3 mm, and a length of about 25 or 30 mm. The thickness of the metal 19a is typically in the order of 2 to 10 microns, and it can vary in accordance with the particular coating method which is used. The sensing element 11b is constructed the same as 11a, and the same reference numerals have been used followed by the small letter "b".

A detailed discussion of film materials and film construction techniques and methods can be found on pages 358 through 365 of a book entitled "Resistance Temperature Transducers", by Virgil A. Sandborn of Colorado State University, published in 1972 by the Metrology Press, Fort Collins, Colo.

As best seen in FIG. 2, cross flow between the sensing elements 11a and 11b is prevented by use of the connecting bridge 12. The material for bridge 12 can be a flexible, thermally isolating, adhesive material, such as Dow-Corning silicone varnish or Dow-Corning #732 silicone rubber adhesive, which serves to firmly bridge the gap between sensing elements 11a and 11b. "TEFLON" (a trademark), silicone resin or other low thermal conductivity bridge materials may be used. If high thermal conductivity material is used, directional sensitivity may be substantially reduced.

As shown in FIG. 2, the axis 21 of the central support portion 15a bisects the angle, $\phi$, between sensing element axes 22a and 22b. Angle $\theta$ should be large enough to prevent sensing element 11a from becoming in contact with sensing element 11b and should not exceed 60 to 70 degrees in order to prevent sensing elements 11a and 11b from coming within the stagnation region of central support 15a when it is ventilated by flow within the plane defined fined by the parallel axes of sensing elements 11a and 11b. For the proportions shown, where the diameter of the central support portion 15a is about three times the diameter of sensing elements 11a and 11b, a useful value for $\theta$ is about 25 to 30 degrees. Optimum performance is realized when $\phi$ is an acute angle. Typically, the central support portion 15a is two to four times the diameter of the individual sensing elements 11a and 11b, in order to provide structural rigidity and to generate a significant turbulent wake which passes over the sensing elements 11a and 11b when fluid flow passes across the central support portion 15a against elements 11a and 11b. The geometric relationship of the support with respect to the sensing elements 11a and 11b is maintained by the use of an adhesive or mechanical attachment, which can be placed at the end of the elements 11a and 11b, or at the lead wires 16a and 16b, close to their attachment point to elements 11a and 11b, as 12a and 12b. The FIG. 2 illustration suggests adhesive attachment such as may be obtained by the use of "RTV" silicone rubber adhesive, or Dow-Corning #732, for example.

Typically, resistance of the platinum films 19a and 19b for a transducer 10 of the scale indicated by the above, is in the 2 ohm to 6 ohm resistance range at room temperature. Optimum film resistance is best determined by the characteristics of the associated electronic controller which is used to excite the transducer 10, and such factors as available power supply source, types of amplifiers used, operating method selected, working fluid, and the like, are all within the control of the instrument designer.

A large ratio of sensing element, 11a and 11b, length to element diameter will produce angular sensitivity to airflow or fluid flow as the flow vector moves away from normal flow which is perpendicular to the cylindrical axes of elements 11a and 11b. Direction sensing is accomplished by sensing elements 11a and 11b as incident flow varies through 360 degrees in the plane contained by the parallel axes of sensing elements 11a and 11b. Direction sign sense can be determined by electrical measurement of the change in relative resistance values of each sensing element 11a and 11b when they are compared with each other in a balanced bridge circuit. Fluid speed is determined by measurement of the magnitude of the differential signal which follows an approximate fourth root relationship to a speed increase.

Figure 3:
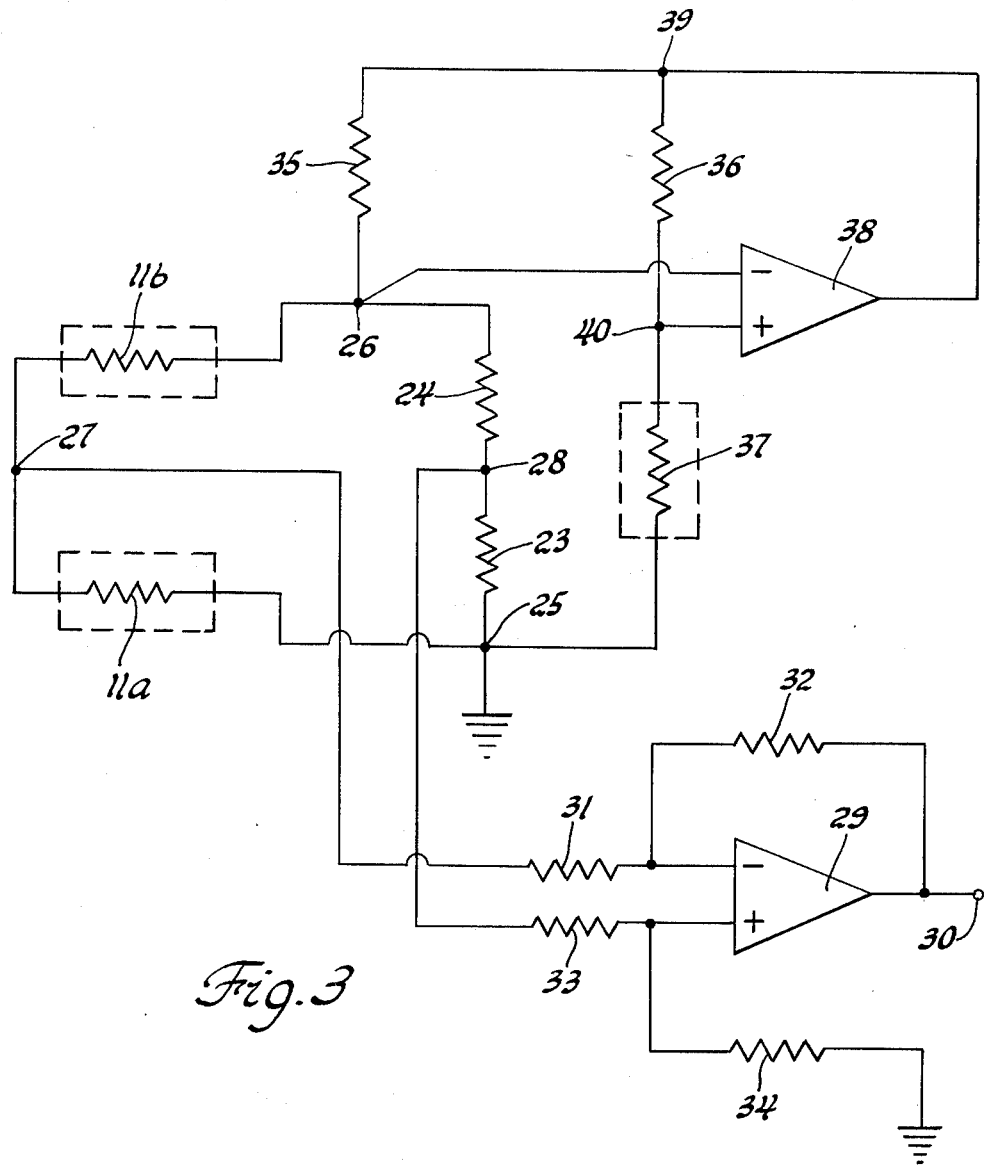
FIG. 3 is a simplified electrical schematic drawing which illustrates excitation and read out means for a dual sensing element transducer of the type illustrated in FIG. 1.

FIG. 3 illustrates a simplified schematic diagram of an electrical excitation and read out circuit which may be used to drive dual element transducers described by FIG. 1. This circuit provides both speed and direction signals from the driven transducer as a composite single output signal. The sensing pair of elements 11a and 11b is shown connected as two arms of a four arm Wheatstone bridge which is also formed by resistors 23 and 24. The resistors 23 and 24 are used to balance the bridge when the fluid medium surrounding the transducer is at rest or at zero speed. Excitation to the bridge of FIG. 3 is provided at connections 25 and 26, and bridge balance between points 27 and 28 is detected and is amplified by a differential amplifier 29, thereby providing a signal 30 which is a measure of the degree of imbalance of the direction bridge. The signal 30 shows imbalance by swinging to either positive or negative polarity when one or the other of the paired sensing elements 11a or 11b is ventilated at a greater speed by impinging fluid flow. The leeward or "down wind" element will "see" a lesser flow speed because of the blocking which is caused by the other or "up wind" element. The magnitude of the resulting differential output signal 30 is a direct measure of speed. Resistors 31 and 33 are the input resistors to amplifier 29 and resistors 32 and 34 are the feedback resistors. Differential gain is set by the ratio of feedback resistors 32 and 34 respectively to input resistors 31 and 33. Typical amplifier gain is in the range of twenty or twenty five for full scale air flow of, for example, 20 meters per second. The bridge formed by the resistors 23 and 24, together with the pair of sensing elements 11a and 11b can be considered to be electrically as a single resistor which in turn becomes one arm of a second Wheatstone bridge which is formed by a power resistor 35 in series with the first Wheatstone bridge, or direction bridge, and by resistors 36 and 37 which are used to balance the second bridge at an operating point determined by the values of resistors 36 and 37. Either resistor 36 or 37 can be varied at the time of bridge design or a potentiometer or variable resistor may be used for one or the other. It is preferred not to use potentiometers for both resistors. This allows operator selection of operating point, power level, and instrument sensitivity. Amplifier 38 is a high gain differential amplifier having a high current output which is fed back in closed loop fashion to the bridge at point 39. The input to amplifier 38 is taken across the bridge at points 26 and 40, and attention must be paid to phasing, in order to assure that negative feedback is used.

Sensing elements 11a and 11b, together with resistors 23 and 24, appear to amplifier 38 to function as a single resistance source which is sensitive to any variation in its constituent parts. The sensing elements 11a and 11b are in fact non-zero temperature coefficient resistors which are subject to self-heating, and when platinum metal is used for the film, their temperature coefficient is a high positive value. This fact permits the setting of the values of the resistors 36 and 37 so that the bridge balance resistance values required for bridge balance are satisfied when the total series-parallel resistance of the direction bridge, taken as a single equivalent resistance, together with power resistor 35, both balance against resistors 36 and 37 by having the same resistance ratios on either side of the bridge. The active side is comprised of resistor 35 together with the direction bridge, resistors 11a and 11b together with resistors 23 and 24. The reference side of the feedback controlled bridge is comprised of resistors 36 and 37.

When the sensing elements 11a and 11b are cold or are non-operating, their resistance is lower than their operating value, and in controlling their operating value through the setting of the reference resistance ratio, the heated resistance values required to self-balance the bridge can be selected, all of which is controlled through means of negative feedback through amplifier 38 back to the bridge at point 39. The feedback loop operates to automatically adjust the current through the total combined bridges until the resistance of sensing elements 11a and 11b attains that value of resistance which balances the bridge. A small offset voltage must be present at the output of amplifier 38 when the circuit is first turned on, and the sensing elements 11a and 11b are at ambient temperature, so that the minute bridge current which flows as a result of the offset voltage is sufficient to develop a small error signal between points 26 and 40, thus permitting the circuit to turn itself on to an operating condition. The aforedescribed mode of operation has been described as a constant temperature (constant resistance) method of hot film anemometer or hot wire anemometer operation.

Resistor 37 can be a temperature sensitive resistor which is physically located as to be exposed to the fluid ambient temperature. If the temperature coefficient of resistance of registor 37 is properly selected the bridge operating level can be automatically adjusted so that ambient temperature is tracked thereby operating the sensing elements 11a and 11b at a constant temperature difference above sensed ambient temperature. This mode of operation can provide constant fluid speed sensitivity irrespective of changes in ambient temperature.

In a typical circuit, the resistance of each of the sensing elements 11a and 11b is 3.3 ohms each at room temperature. The usual precautions must be observed when high temperature coefficient resistors are measured at a particular temperature so that measurement precision is preserved. The power resistor 35 is 2 ohms, and it has a low temperature coefficient of resistance, and adequate physical size, so that self-heating does not cause appreciable change in its nominal resistance value with varying operating current levels. It must be observed that the full sensing element operating current passes through resistor 35. For the transducer 10 of FIGS. 1 and 2, which is built to the scale indicated by the examples, typical zero speed current levels may be in the 0.1 ampere range, and at maximum flow, with current levels approaching one ampere for an extreme case. Resistor 36 is 499 ohms and may be a precision film or precision wire-wound resistor. Values of resistors 23 and 24 are 10,000 to 30,000 ohms each, so as to avoid needless loading of the sensing elements 11a and 11b and resistors 23 and 24 are carefully matched so that with zero fluid flow conditions the potentials at points 27 and 28 closely match thereby providing a nulled input to amplifier 29 producing a zero output at point 30 for zero fluid flow. A value of about 2,245 ohms for resistor 37 will cause the direction bridge total resistance to rise to 9 ohms, thereby balancing the bridge. The resulting surface temperature of sensing elements 11a and 11b will be in the 125 to 135 degree Celsius range.

Output 30 is bipolar and indicates which sensing element, 11a or 11b, faces the impinging fluid flow. The sensing element facing the flow will be caused by cooling to be lower in resistance than the sensing element away from the flow which is cooled less and which will increase in resistance while their total series resistance remains constant. The magnitude of output 30 is non-linear with reference to incident fluid speed and it indicates the amount of heat which is lost to the flowing mass of the fluid stream.

Amplifiers 29 and 38 can be integrated circuit operational amplifiers which are operated from positive and negative 12 or 15 volt power sources. Fifteen volt operation can produce at least ten volt signal swings at output 30. When two or more similar FIG. 3 bridge circuits are used, with an array of two or more transducers, proper ground and power supply circuit wiring must be provided in order to avoid unwanted cross talk between transducers and resulting failure to operate properly. Amplifiers 29 and 38 can also be of a type which uses only a single power supply potential such as 15 or 20 volts. In this case the + input to amplifier 29 can be biased in the positive direction thereby offsetting the null condition for zero fluid flow to a pre-selected positive value at the output 30.

Figure 4:
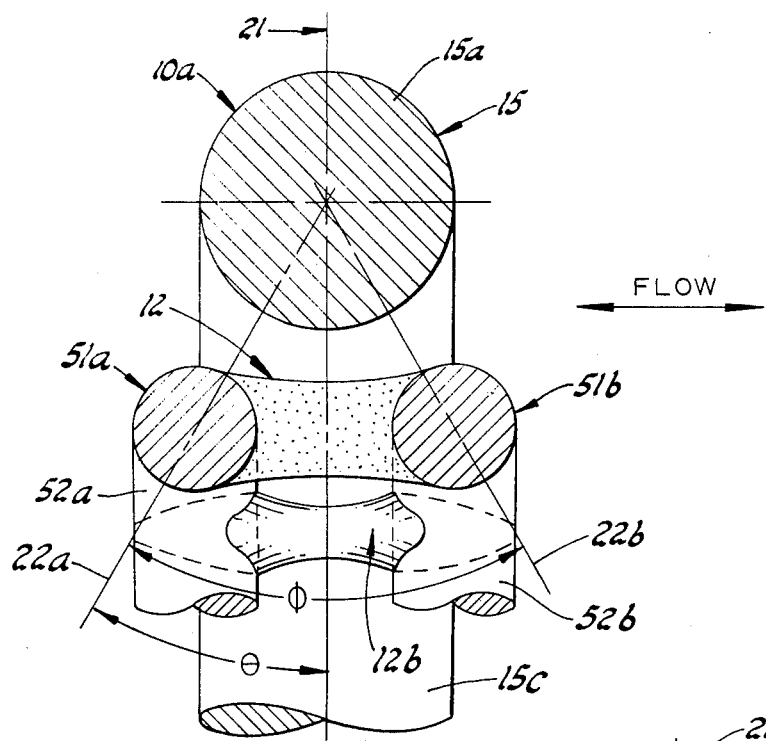
FIG. 4 is an elevational section view, similar to FIG. 2, and illustrating a second embodiment wherein the two sensing elements are wires rather than films.

FIG. 4 illustrates a cross section of a modified two element transducer, generally indicated by the numeral 10a, which is the same as the transducer 10 of FIGS. 1 and 2, but with wire sensing elements 51a and 51b substituted for the film sensing elements 11a and 11b. Lead wires 52a and 52b are attached to the sensing wires 51a and 51b, respectively, at each end thereof, by any suitable means, as by fusion welding, capacitance discharge welding or brazing. A larger diameter lead wire can be used in order to reduce the effect of lead wire series resistance upon transducer operation. The same reference numerals as used in FIGS. 1 and 2 are used to designate the various parts of the transducer 10a which are the same as the transducer 10. It should be realized that the use of wire sensing elements can permit a very substantial overall reduction of the transducer size. As long as the support member 15 has sufficient mechanical integrity to support the transducer array, it can be used to position the two sensing elements 51a and 51b with respect to one another. Because of currently available wire sizes, and micro-manufacturing techniques, practical small size transducers can be fabricated which approach the size of a pin head. When such small transducers are to be fabricated the adhesive and supporting materials which are used can be fused quartz or glass.

Figure 5:
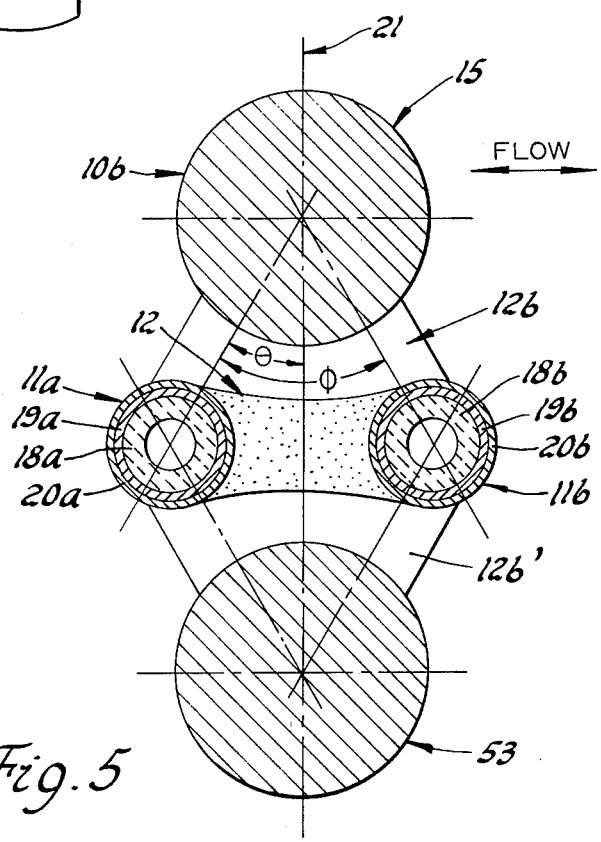
FIG. 5 is an elevational section view, similar to FIG. 2, and illustrating a third embodiment wherein a second support member is mounted opposite to the first support member.

FIG. 5 illustrates a cross section of a modified two element transducer 10b which is the same as the transducer 10 of FIGS. 1 and 2, but with a second support member 53 mounted opposite to the first support member 15. The support members 15 and 53 are connected at one or both ends to the sensing elements 11a and 11b by suitable attachment means 12b and 12b', respectively. As shown, the transducer 10b can be single-ended, that is, constructed as a cantilever, or double-ended, with construction similar to that shown by the transducer 10 of FIG. 1. Cantilever construction is particularly useful when a transducer is desired which senses both speed and sign sense of direction as in pipe line or tunnel applications. For optimum results having symmetrical sensitivity of response for flow from any angle, the support members 15 and 53 should be the same size, and positioned as the mirror image of each other. Biased operation with deflected flow can be realized when the support member 15 is of a different size and spacing than support member 53 from sensing elements 11a and 11b. In the case where sensing elements 11a and 11b are single-ended or cantilever mounted at one end, the support member 53 can be an extension of support member 15 which is bent back on itself 180 degrees with sufficient space between the support members to locate sensing elements 11a and 11b.

While there have been shown and described the preferred embodiments of the invention, it is understood that various changes, omissions, and substitutions may be made by those skilled in the art.

INDUSTRIAL APPLICABILITY

The directional heat loss anemometer transducer of the present invention is adapted for use in various types of commercial apparatus for determining the speed, mass flow, and direction of motion relative to the fluid in which the transducer is immersed. For example, the transducer of the present invention may be used in long road tunnels to determine the air speed through the tunnel, as well as the direction of air flow.

I claim:

1. A directional heat loss anemometer transducer comprising:
   (a) at least two similar, thermally and physically separated cylindrical resistive electrical conductors;
   (b) each of said conductors having a length at least equal to the largest cross section dimension of the conductor;
   (c) a cylindrical support member centrally disposed between and alongside said two resistive electrical conductors;
   (d) said cylindrical support member having a straight central portion and a mounting portion on at least one end of said central portion;
   (e) said electrical conductors being disposed as a parallel pair finitely separated, and mounted parallel to and in close proximity to the straight central portion of the cylindrical support member;
   (f) said cylindrical support member straight central portion being disposed so that a plane containing the parallel central axes of said two resistive electrical conductors is spaced from the cylindrical support member central portion and is perpendicular to a plane containing the central axis of said cylindrical support member straight central portion and disposed between said two resistive electrical conductors, said cylindrical support and resistive electrical conductor axial centers defining an acute angle between center lines through each of said resistive electrical conductors and said cylindrical support when viewed in cross section;
   (g) a thermo insulating connective bridging means operatively disposed between said two resistive electrical conductors and closing the space between said resistive electrical conductors, thereby preventing connected flow completely around one conductor of said two resistive electrical conductors, independent of the other conductor;
   (h) said two resistive electrical conductors being supported in the protected lee of the support member straight central portion by attachment means to the support member; and,
   (i) each of said resistive electrical conductors being provided with electrical connection means, whereby each resistive electrical conductor can be electrically heated by an electrical current passed through each conductor.

2. A directional heat loss anemometer transducer as defined in claim 1, wherein:
   (a) said two resistive electrical conductors are wires which are solid in cross section.

3. A directional heat loss anemometer transducer as defined in claim 1, wherein:
   (a) each of said resistive electrical conductors includes a hollow tubular electrically non-conductive refractory cylindrical substrate supporting body extending the length of the conductor, and a conductive resistance film having a non-zero temperature coefficient of resistance adhered to the outer surface of the substrate body and extending over the length of the substrate body, and an overall protective coating which continuously extends over the outer surface of the conductive resistance film over the entire length of the conductive resistance film.

4. A directional heat loss anemometer transducer as defined in any one of claims 1 through 3, wherein:
   (a) said centrally disposed cylindrical support member is a straight cylindrical bar.

5. A directional heat loss anemometer transducer as defined in any one of claims 1 through 3, wherein:
   (a) said centrally disposed cylindrical support member is U-shaped with a mounting portion at each end being perpendicular to the central portion.

6. A directional heat loss anemometer transducer as defined by any one of claims 1 through 3, wherein:
   (a) a second cylindrical support member is centrally disposed between and alongside said two cylindrical resistive electrical conductors and is situated on the side of said two cylindrical resistive electrical conductors opposite and parallel to said first cylindrical support member.

7. A directional heat loss anemometer transducer as defined in any one of claims 1 through 3, wherein:
   (a) said two cylindrical resistive electrical conductors are connected together in a series arrangement, and a pair of series connected balancing resistors are connected in parallel across said series connected two cylindrical resistive electrical conductors so as to form a first four arm Wheatstone bridge;
   (b) said first four arm Wheatstone bridge being connected in series with a resistor, and with a pair of series balancing resistors which are connected in parallel across said first four arm Wheatstone bridge and said series connected resistor so as to form a second Wheatstone bridge;
   (c) said second Wheatstone bridge being operatively connected to a first differential error amplifier and current booster amplifier whose output is fed back, in a negative feedback manner, to the top of said second Wheatstone bridge, the top of said second Wheatstone bridge being defined as the junction point of said pair of series balancing resistors with said series resistor which is connected to said first four arm Wheatstone bridge and the bottom of said second Wheatstone bridge being defined as the junction point of the opposite end of said series balancing resistors with the other end of said first four arm Wheatstone bridge, thereby providing for bridge excitation and consequent operation of said directional heat loss anemometer transducer as a constant temperature anemometer, wherein the error signal is taken from the junction of the top of said first four arm Wheatstone bridge and said series resistor and from the junction of said series balancing resistors which form said second Wheatstone bridge which is a feedback controlled bridge;
   (d) one of said series balancing resistors forming said second Wheatstone bridge, which is opposite said first four arm Wheatstone bridge, having a non-zero temperature coefficient and functioning as an ambient temperature sensor which modifies the balance of said second Wheatstone bridge in accordance with variations in sensed ambient temperature; and, (e) a second balanced differential amplifier means operatively connected across said first four arm Wheatstone bridge with said second amplifier's two input signals being derived from the midpoint or junction of said two cylindrical resistive electrical sensing conductors and the mid-point or junction of said pair of series connected balancing resistors, wherein said second balanced differential amplifier produces an amplified composite output signal which is a measurement of speed and direction sign sense of the fluid flow past and across said two cylindrical electrical sensing conductors.

8. A directional heat loss anemometer transducer comprising:

(a) two parallel, cylindrical resistive electrical conductors which are connected together in a series arrangement, and a pair of series connected balancing resistors which are connected in parallel across said series connected two cylindrical resistive electrical conductors so as to form a first four arm Wheatstone bridge;

(b) a thermo insulating connective bridging means operatively disposed between said two parallel, cylindrical resistive electrical conductors and closing the space between said parallel, cylindrical resistive electrical conductors, thereby preventing connected flow completely around one conductor of said two parallel, cylindrical resistive electrical conductors, independent of the other conductor;

(c) a cylindrical support member centrally disposed between and alongside said two parallel, cylindrical resistive electrical conductors and attached to said conductors by attachment means;

(d) said first four arm Wheatstone bridge being connected in series with a resistor, and with a pair of series balancing resistors which are connected in parallel across said first four arm Wheatstone bridge and said series connected resistor so as to form a second Wheatstone bridge;

(e) said second Wheatstone bridge being operatively connected to a first differential amplifier error amplifier and current booster amplifier whose output is fed back, in a negative feedback manner, to the top of said second Wheatstone bridge, and wherein the top of said second Wheatstone is defined as the junction point of said pair of series balancing resistors with said series resistor which is connected to said first four arm Wheatstone bridge and the bottom of said second Wheatstone bridge is defined as the junction point of the opposite end of said series balancing resistors with the other end of said first four arm Wheatstone bridge, thereby providing for bridge excitation and consequent operation of said two cylindrical resistive electrical conductors as a constant temperature anemometer, wherein the error signal is taken from the junction of the top of said first four arm Wheatstone bridge and said series resistor and from the junction of said series balancing resistors which form said second Wheatstone bridge which is a feedback controlled bridge;

(f) one of said series balancing resistors forming said second Wheatstone bridge, which is opposite said first four arm Wheatstone bridge, having a non-zero temperature coefficient and functioning as an ambient temperature sensor which modifies the balance of said second Wheatstone bridge in accordance with variations in sensed ambient temperature; and, (g) a second balanced differential amplifier means operatively connected across said first four arm Wheatstone bridge with said second amplifier's two input signals being derived from the midpoint or junction of said two parallel cylindrical resistive electrical conductors and the mid-point or junction of said pair of series connected balancing resistors, wherein said second balanced differential amplifier produces an amplified composite output signal which is a measurement of speed and direction sign sense of the fluid flow past and over and across said two parallel cylindrical resistive electrical conductors.

* * * * *